US010611310B2

(12) United States Patent
Jones

(10) Patent No.: US 10,611,310 B2
(45) Date of Patent: Apr. 7, 2020

(54) VEHICLE INTERIOR COMPONENT

(71) Applicant: Shanghai Yanfeng Jinqiao Automotive Trim Systems Co. Ltd., Novi, MI (US)

(72) Inventor: Bryan Todd Jones, Holland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 146 days.

(21) Appl. No.: 15/914,623

(22) Filed: Mar. 7, 2018

(65) Prior Publication Data

US 2018/0194295 A1 Jul. 12, 2018

Related U.S. Application Data

(63) Continuation of application No. PCT/US2016/054029, filed on Sep. 27, 2016.
(Continued)

(51) Int. Cl.
*B60R 7/04* (2006.01)
*E05B 83/32* (2014.01)
*B60R 11/00* (2006.01)

(52) U.S. Cl.
CPC ............... *B60R 7/04* (2013.01); *E05B 83/32* (2013.01); *B60R 2011/0007* (2013.01); *B60R 2011/0094* (2013.01)

(58) Field of Classification Search
CPC ................. B60R 7/04; B60R 2011/007; B60R 2011/0094; E05B 83/32
(Continued)

(56) References Cited

U.S. PATENT DOCUMENTS 5,265,450 A 11/1993 Doyle
6,062,623 A 5/2000 Lemmen
(Continued)

FOREIGN PATENT DOCUMENTS

DE 102010063707 A1 6/2012
EP 1916132 A1 4/2008
(Continued)

OTHER PUBLICATIONS

International Search Report and Written Opinion from the International Searching Authority for International Patent Application No. PCT/US2016/054029 dated Feb. 6, 2017 (in English) (15 pages).
(Continued)

*Primary Examiner* — Joseph D. Pape
*Assistant Examiner* — Dana D Ivey

(57) ABSTRACT

A component for a vehicle interior is disclosed. The component may comprise a base comprising a bin, a cover configured to cover the bin, an interface for the cover and a mechanism configured to retain the cover to the base. The mechanism may comprise at least one pin configured to rotate in response to translation at the interface to release the cover from the base. The interface may comprise a button configured to move in the opening direction from a forward position to a rearward position to unlock the cover from the base. The cover may be configured to move in the opening direction as the button moves from the forward position toward the rearward position. The mechanism may comprise a link to rotate in response to translation of the button to rotate the pin to unlock the cover from the base.

20 Claims, 11 Drawing Sheets

Related U.S. Application Data

(60) Provisional application No. 62/233,889, filed on Sep. 28, 2015.

(58) Field of Classification Search
USPC .................................................... 296/24.34
See application file for complete search history.

(56) References Cited

U.S. PATENT DOCUMENTS

| | | | |
|---|---|---|---|
| 6,120,069 | A | 9/2000 | Taranto |
| 6,499,785 | B2 | 12/2002 | Eguchi |
| 7,823,949 | B2 | 11/2010 | VandenHeuvel et al. |
| 8,376,436 | B2 | 2/2013 | Nakamura et al. |
| 8,579,348 | B1 | 11/2013 | Myers |
| 2003/0209956 | A1 | 11/2003 | Bae |
| 2004/0080173 | A1 | 4/2004 | Niwa et al. |
| 2010/0213729 | A1* | 8/2010 | Spitler .................. B60N 3/101 296/1.08 |
| 2011/0309640 | A1 | 12/2011 | Matsubara |
| 2013/0113231 | A1 | 5/2013 | Park et al. |
| 2014/0167435 | A1 | 6/2014 | Sherburn |
| 2015/0337572 | A1 | 11/2015 | Tsalenko et al. |
| 2016/0339848 | A1 | 11/2016 | Hodgson |
| 2016/0340942 | A1 | 11/2016 | Anderson et al. |
| 2017/0050572 | A1 | 2/2017 | Anderson |

FOREIGN PATENT DOCUMENTS

| | | |
|---|---|---|
| FR | 394843 | 2/1909 |
| FR | 2817897 A1 | 6/2002 |
| GB | 2366554 A | 3/2002 |
| JP | 2006076344 A | 3/2006 |
| WO | 2015120034 A1 | 8/2015 |
| WO | 2015123442 A1 | 8/2015 |
| WO | WO-2015120034 A1 * | 8/2015 |
| WO | 2015138751 A1 | 9/2015 |
| WO | 2015179551 A1 | 11/2015 |
| WO | 2017058829 A1 | 4/2017 |

OTHER PUBLICATIONS

Extended European Search Report from the European Patent Office for EP Application No. 16852433.8 dated Jan. 29, 2019 (in English) (8 pages).

* cited by examiner

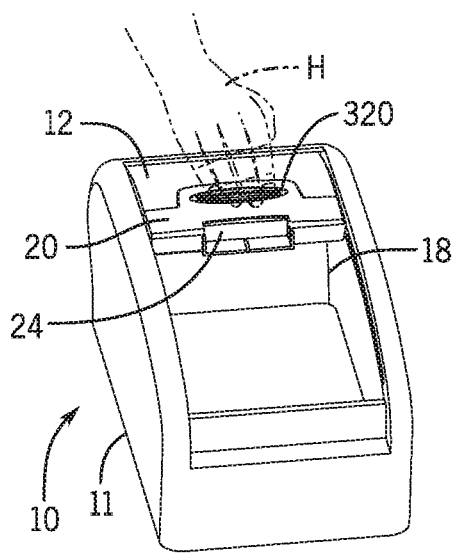
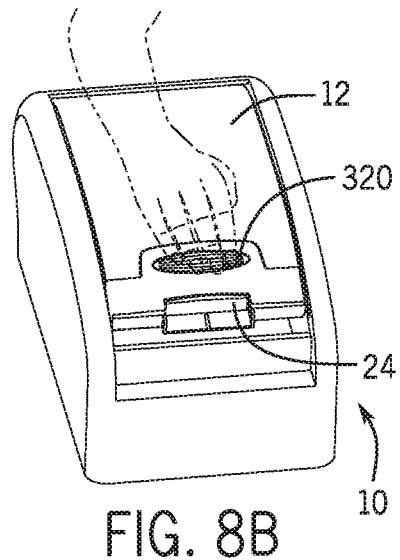
FIG. 8A   FIG. 8B
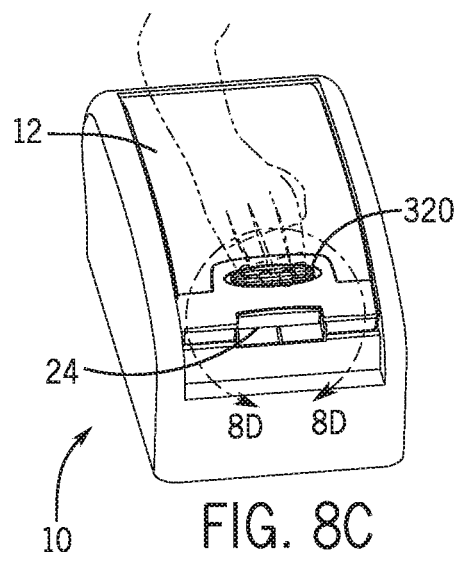
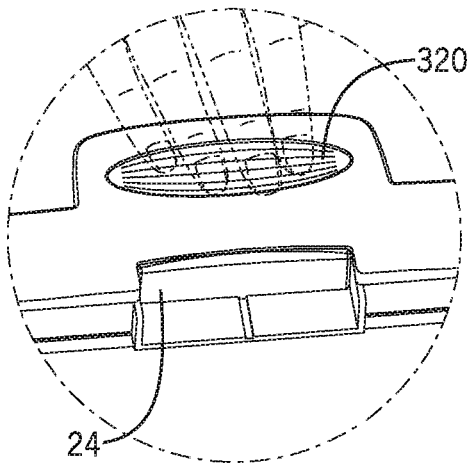
FIG. 8C   FIG. 8D
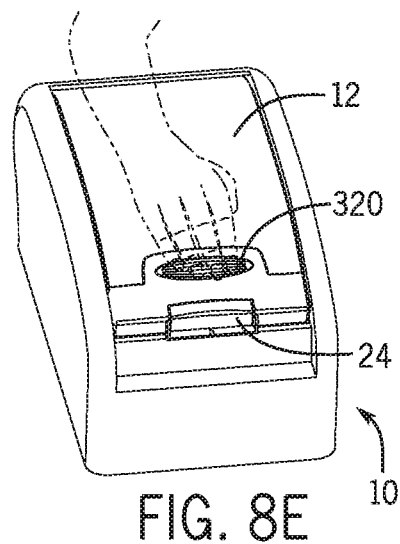
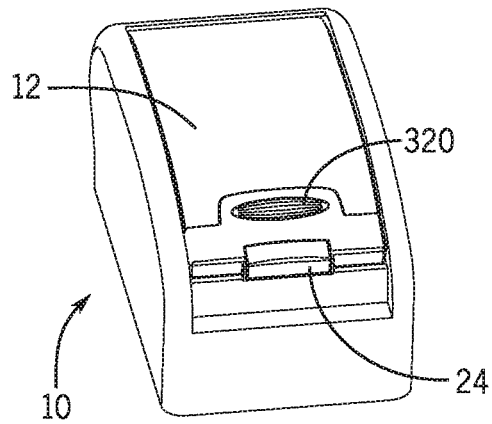
FIG. 8E   FIG. 8F

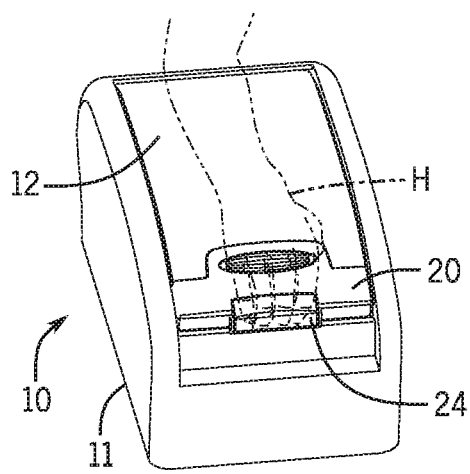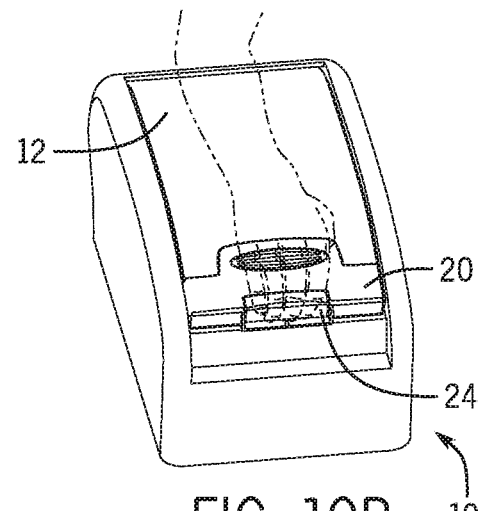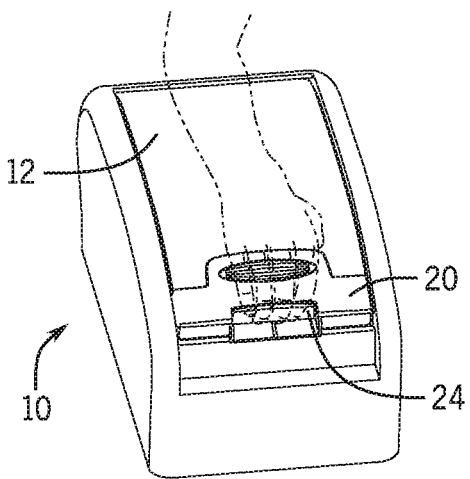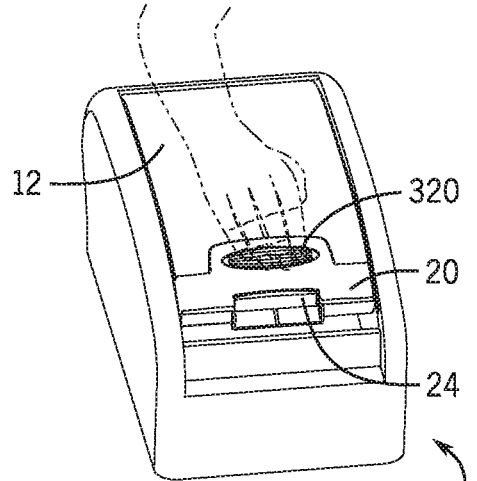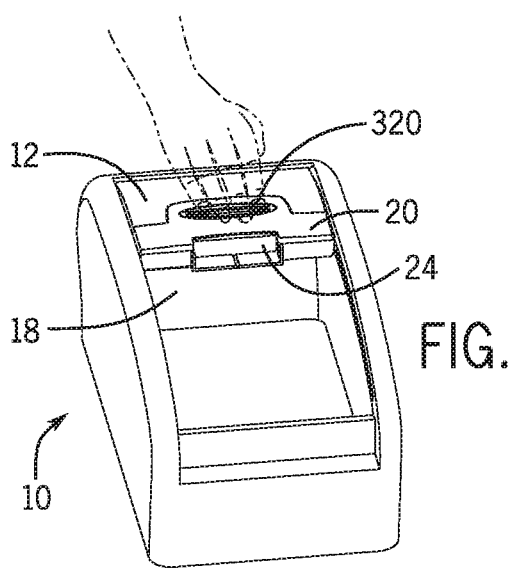

VEHICLE INTERIOR COMPONENT

CROSS REFERENCE TO RELATED APPLICATIONS

The present application is a continuation of International/PCT Patent Application No. PCT/US2016/054029 titled "VEHICLE INTERIOR COMPONENT" filed Sep. 27, 2016, which claims the benefit of U.S. Provisional Patent Application No. 62/233,889 titled "COMPONENT FOR VEHICLE INTERIOR WITH DOOR COVERING BIN" filed Sep. 28, 2015.

The present application claims priority to and incorporates by reference in full the following applications: (a) U.S. Provisional Patent Application No. 62/233,889 titled "COMPONENT FOR VEHICLE INTERIOR WITH DOOR COVERING BIN" filed Sep. 28, 2015; (b) International/PCT Patent Application No. PCT/US2016/054029 titled "VEHICLE INTERIOR COMPONENT" filed Sep. 27, 2016.

FIELD

The present invention relates to a vehicle interior component. The present invention also relates to a vehicle interior component such as a floor console.

BACKGROUND

It is known to provide a console such as a floor console for a vehicle interior. It is also known to provide an armrest on the floor console to facilitate comfort for vehicle occupants. It is further known to provide a storage compartment within the floor console covered by a door. It is further known to provide a latch on the door to secure the door on the floor console.

It would be advantageous to provide an improved floor console with an improved latch on an improved door to facilitate movement of the improved door between a closed position and an open position.

SUMMARY

The present invention relates to a component for a vehicle interior. The component comprises a base, a bin, a door configured to cover the bin and a latch configured to lock the door to the base. The door may move relative to the base as the latch is actuated; the latch may be configured to move from an engaged position to a released position through a partially released position to unlock the door from the base. The latch may comprise at least one pin configured to lock the door to the base. The at least one pin may be configured to move in response to actuation of the latch to unlock the door from the base. The latch may comprise a button, at least one pin and at least one link wherein the link couples the at least one pin to the button and wherein the link moves the pin in response to movement of the button to unlock the door from the base. The latch may comprise at least one of (a) an actuator; (b) a slide block; (c) a button that can be moved to unlock the door from the base. The door may comprise a button configured to move from a raised position to a depressed position through an intermediate position to unlock the door from the base; the door may comprise a spring configured to bias the button in the raised position. The base may comprise at least one of an opening, a recess, a gap and a hole configured to lock the door to the base. The door may comprise at least one of a tambour door, a semi-rigid sheet, a flexible sheet, plastic and cloth. The force to unlock the door from the base may be less than the force to slide the door relative to the base.

The present invention also relates to a component for a vehicle interior. The component comprises a base comprising side rails, a bin, a door configured to cover the bin and slide in a first direction, a latch configured to lock the door to the side rails of the base and a handle configured to slide in a second direction in response to an external force. The door may comprise the latch; the latch may comprise the handle; the first direction may comprise the second direction. The cover may comprise the latch; the latch may comprise the handle. The at least one side rail may comprises gap; the latch may comprise at least one pin configured to engage with the gap to the lock the cover to the base. The cover may comprise a button configured to move the at least one pin to disengage the at least one pin from the gap of the side rail to unlock the cover from the base. The at least one pin may be configured to move from an engaged position to a detached position through a partially detached position; the cover may be configured to move relative to base when the pin is in the detached position and the partially detached position. The at least one side rail may be configured to prevent movement of the handle. The latch may comprise at least one pin, at least one link and a spring; the link may move the pin in response to compression of the spring to unlock the cover from the base. The force to unlock the door from the base may be less than the force to slide the door relative to the base.

The present invention also relates to a component for a vehicle interior. The component comprises a base comprising a bin, a cover configured to cover the bin and move to uncover the bin, a user interface for the cover and a mechanism comprising a pin configured to retain the cover to the base. The pin may be configured to rotate in response to translation at the user interface to release the cover from the base. The cover may move relative to the bin in response to rotation of the pin. The user interface may comprise a button configured to be deployed in alignment with a direction of movement of the cover.

The present invention also relates to a component for a vehicle interior. The component may comprise a base comprising a bin; a cover configured to cover the bin and move in an opening direction to uncover the bin; an interface for the cover; and a mechanism configured to retain the cover to the base. The mechanism may comprise at least one pin configured to rotate in response to translation at the interface to release the cover from the base. The cover may move relative to the bin as the at least one pin rotates in response to translation at the interface. The at least one pin may be configured to move from an engaged position to a detached position through a partially detached position. The cover may be configured to move relative to base when the at least one pin is in the partially detached position. The interface may comprise a button configured to be deployed in alignment with the opening direction. The button may be configured to move in the opening direction from a forward position to a rearward position to unlock the cover from the base. The mechanism may comprise at least one link configured to rotate the at least one pin to unlock the cover from the base in response to translation of the button. The at least one link may be configured to rotate in response to translation of the button to rotate the at least one pin to unlock the cover from the base. A first end of the at least one link may be coupled to the button and a second end of the at least one link may be coupled to the at least one pin.

The present invention also relates to a component for a vehicle interior. The component may comprise a base comprising a bin; a cover configured to cover the bin and move in an opening direction to uncover the bin; an interface for the cover; and a mechanism configured to retain the cover to the base. The interface may comprise a button configured to move in the opening direction from a forward position to a rearward position to unlock the cover from the base. The cover may comprise a spring configured to bias the button in the forward position. The spring may be configured to compress in alignment with the opening direction in response to deployment of the button. The spring may be configured to bias the button in a direction generally opposite the opening direction. The mechanism may comprise a housing. The spring may be compressed against the housing in response to deployment of the button.

The present invention further relates to a component for a vehicle interior. The component may comprise a base comprising a bin; a cover configured to cover the bin and move in an opening direction to uncover the bin; an interface for the cover; and a mechanism configured to retain the cover to the base. The interface may comprise a button configured to move from a forward position to a rearward position to unlock the cover from the base. The cover may be configured to move in the opening direction as the button moves from the forward position toward the rearward position. The mechanism may comprise at least one pin configured to move relative to the base from an engaged position to a detached position through a partially detached position. The cover may be configured to move relative to base when the at least one pin moves from the engaged position toward the partially detached position. The base may comprise at least one rail. The at least one pin may be configured to rotate relative to the at least one rail to unlock the cover from the base. The at least one rail may comprise a gap. The at least one pin may be configured to engage the gap to lock the cover to the base. The at least one pin may be configured to rotate out of the gap to unlock the cover from the base. The mechanism may comprise at least one link configured to rotate the at least one pin to unlock the cover from the base. A first end of the at least one link may be coupled to the button and a second end of the at least one link may be coupled to the at least one pin. The button may be configured to translate to rotate the first end of the at least one link and the second end of the at least one link. The button may be configured to move in the opening direction to move the cover in the opening direction to uncover the bin.

FIGURES

FIGS. 8A to 8C and 8E to 8F are schematic perspective views of the door for the console moving from the closed position to the open position according to an exemplary embodiment.

FIG. 8D is a schematic perspective view of the latch mechanism for the door for the console according to an exemplary embodiment.

FIGS. 10A to 10E are schematic perspective views of the door for the console moving from the closed position to the open position according to an exemplary embodiment.

DESCRIPTION

Referring to FIGS. 1A to 1D, a vehicle V is shown according to an exemplary embodiment, including an interior I with instrument panel IP and floor console FC; vehicle V also provides seats ST. As shown schematically in FIGS. 1A and 1B according to an exemplary embodiment, floor console FC serves as an armrest as well as a storage compartment. Floor console FC comprises a door shown as a tambour door TD.

Figure 1A:
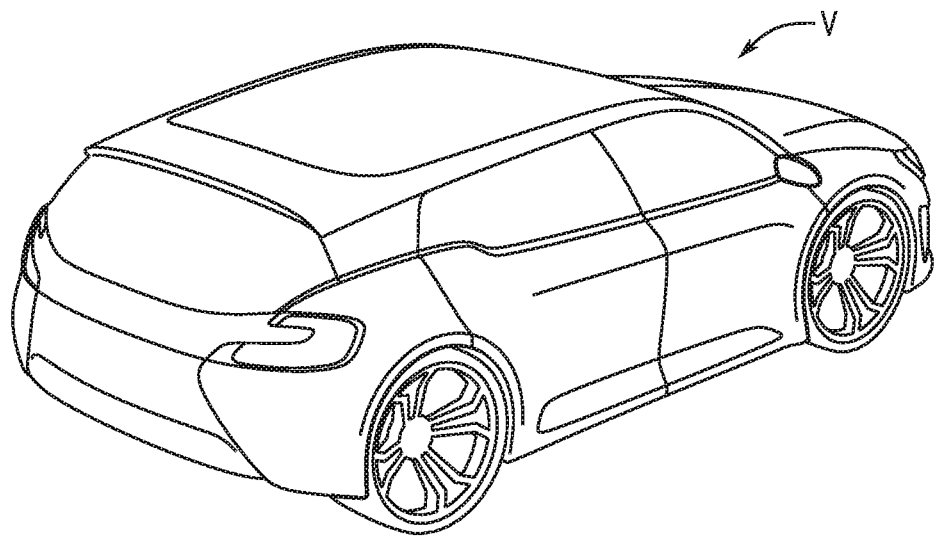
FIG. 1A is a schematic perspective view of a vehicle according to an exemplary embodiment.
Figure 1B:
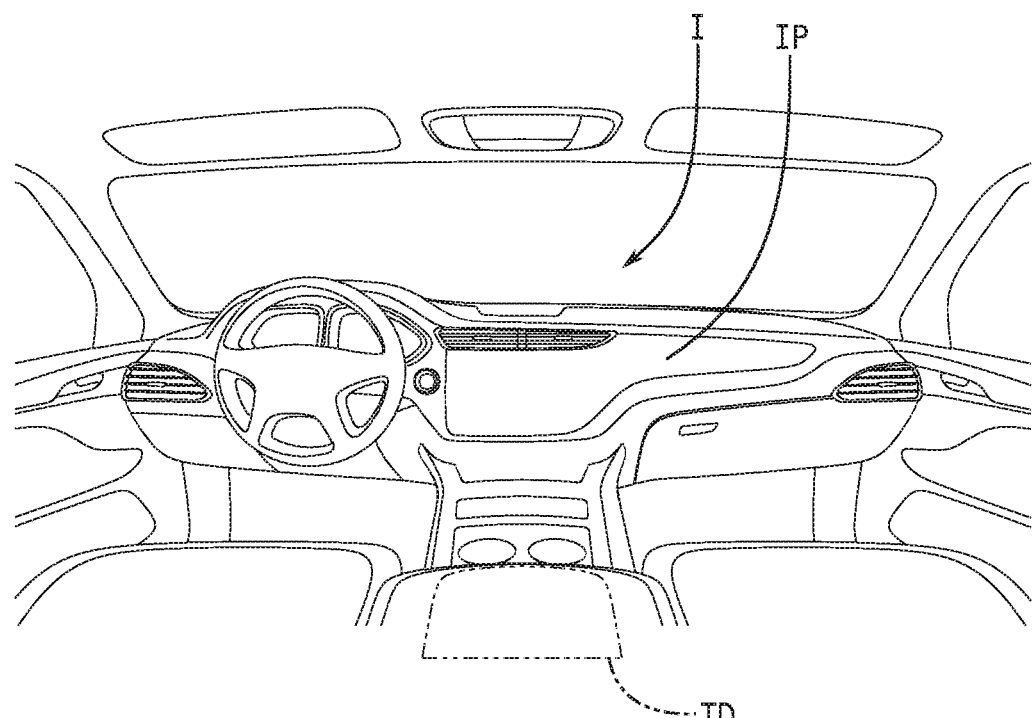
FIG. 1B is a schematic perspective view of an interior of the vehicle according to an exemplary embodiment.
Figure 1C:
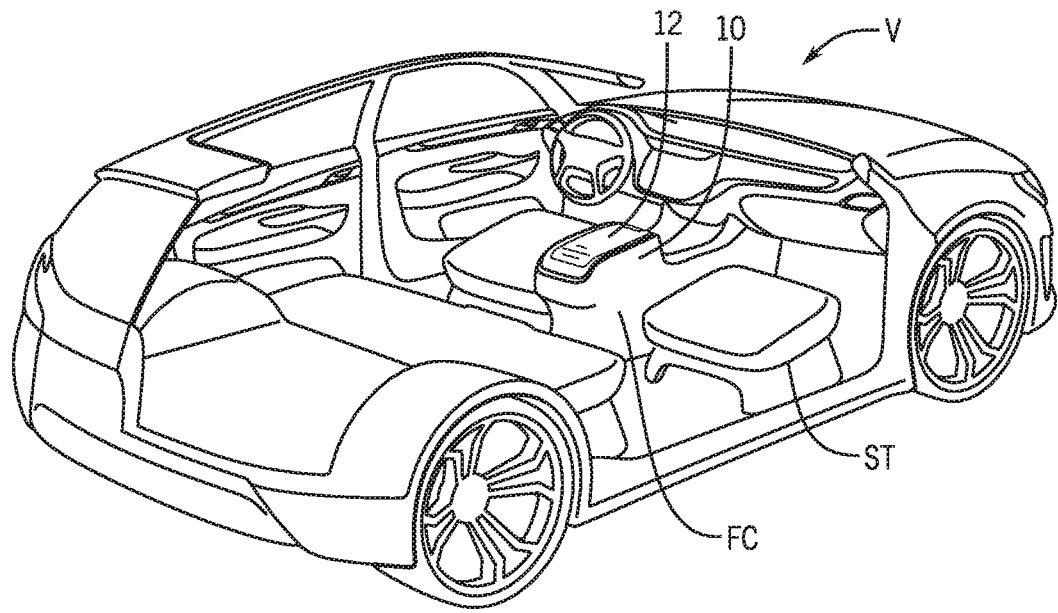
FIGS. 1C and 1D are schematic perspective cut-away views of the vehicle showing the interior according to an exemplary embodiment.
Figure 1D:
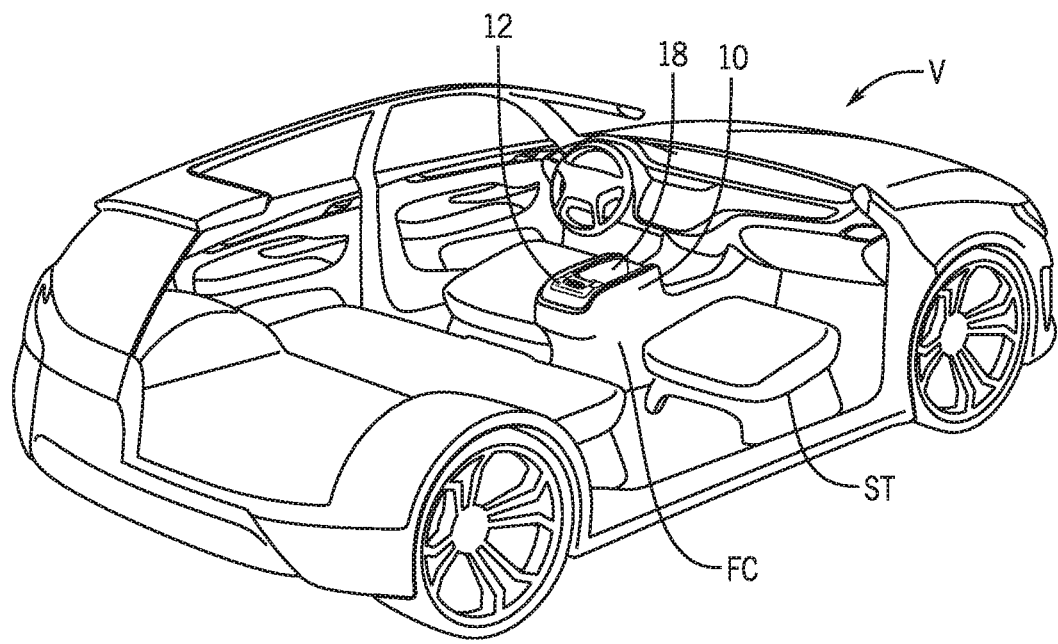

As shown schematically in FIGS. 1C and 1D, floor console FC comprises a component 10; component 10 provides a door 12 shown as a tambour door 12 and a bin 18; door 12 facilitates access to the storage compartment within bin 18. As shown in FIGS. 1C and 1D according to an exemplary embodiment, door 12 is configured to move between a closed position (shown in FIG. 1C) and an open position (shown in FIG. 1D); door 12 is supported (e.g. by side rails 14 shown in FIG. 5A) at the closed position and substantially concealed from view (e.g. by the base) at the open position.

Figure 2A:
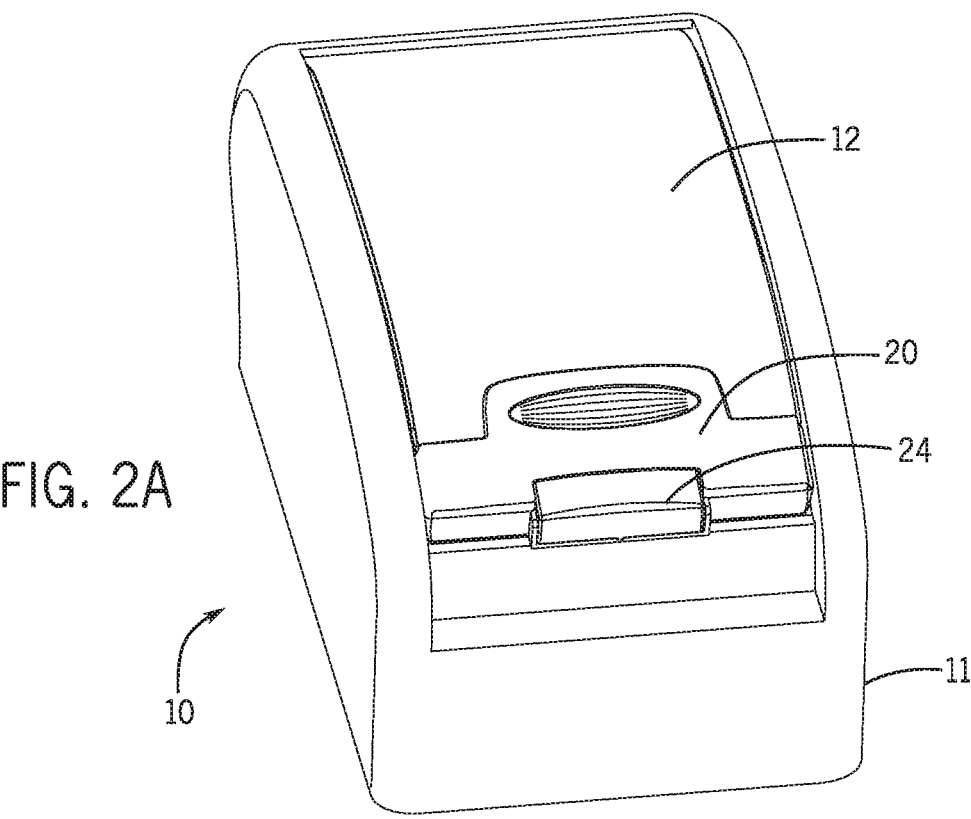
FIG. 2A is a schematic perspective view of a console for the vehicle interior in a closed position according to an exemplary embodiment.

According to an exemplary embodiment as shown schematically in FIG. 2A, component 10 may comprise a base 11 and door 12. As shown schematically in FIG. 2A, door 12 is at the closed position; as shown schematically in FIG. 2B, door 12 is at the open position. As shown schematically in FIGS. 2A and 2B, door 12 provides a latch 20 and a button 24; base 11 comprises bin 18. According to an exemplary embodiment, door 12 is configured to cover bin 18 when door 12 is at the closed position; bin 18 is exposed and accessible when door 12 is at the open position.

Figure 3A:
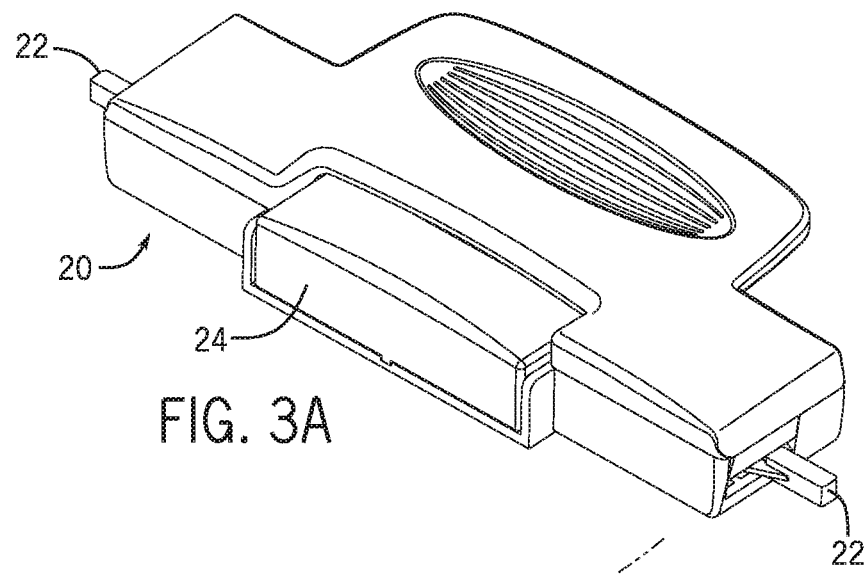
FIGS. 3A to 3C are schematic perspective views of a latch assembly for the console according to an exemplary embodiment.
Figure 3B:
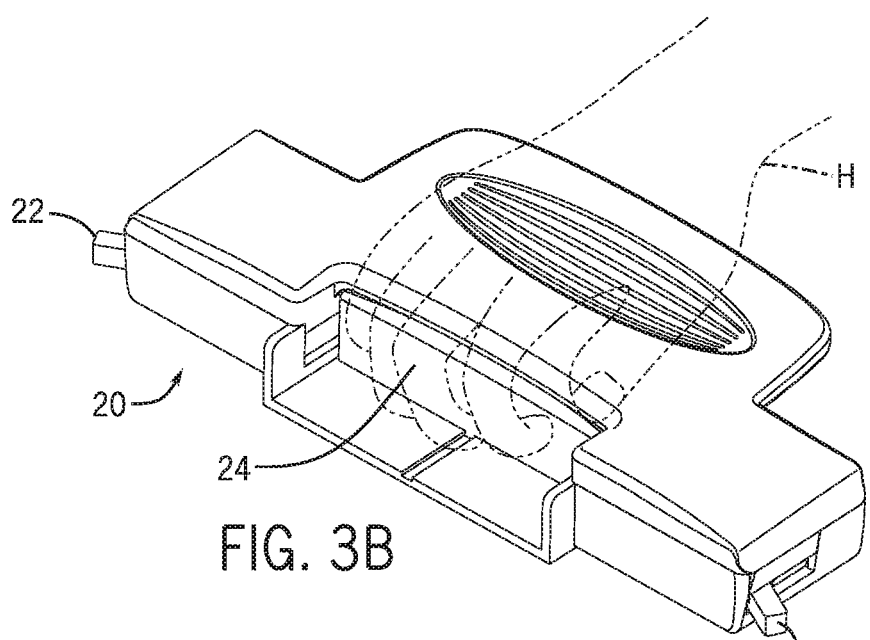
Figure 3C:
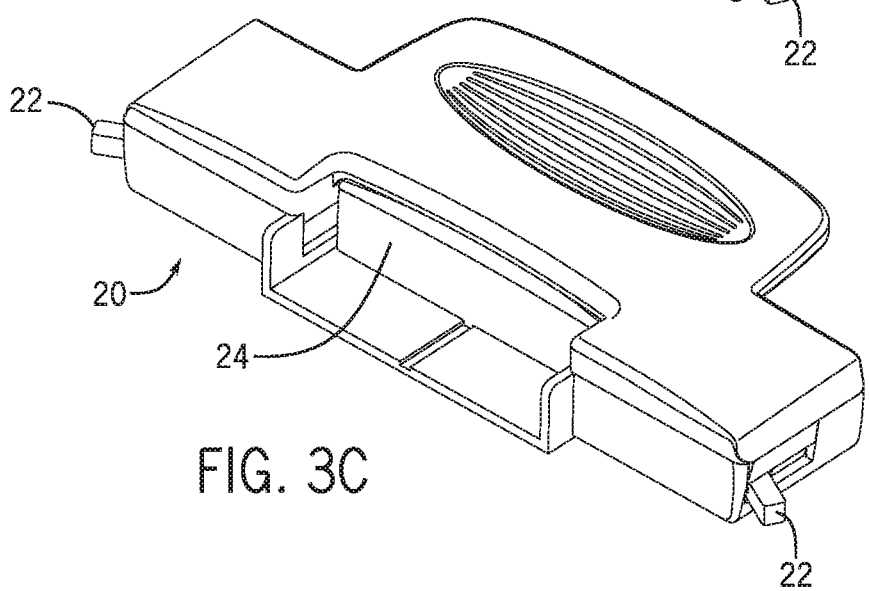

According to an exemplary embodiment as shown schematically in FIGS. 3A to 3C, latch 20 provides button 24 and two opposing pins 22; button 24 may be configured to move (e.g. actuated) between an un-depressed/default position (shown in FIG. 3A) and a depressed position (shown in FIGS. 3B and 3C); pins 22 may be configured to move between an extended position and a retracted position (e.g. as actuated at the button). According to an exemplary embodiment, when button 24 is at the un-depressed/default position, pins 22 are at the extended position; when button 24 is at the depressed position, pins 22 are at the retracted position.

Figure 4:
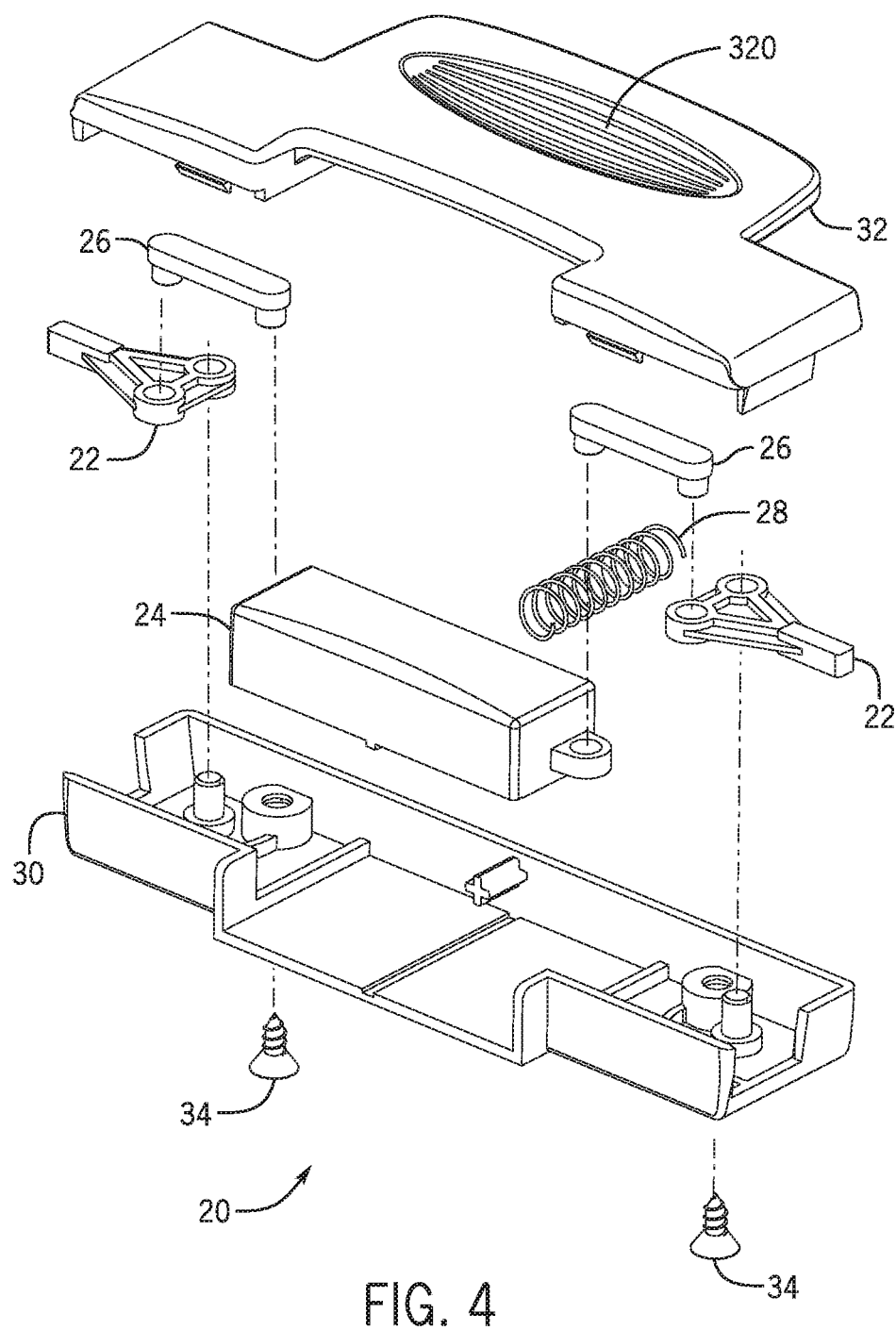
FIG. 4 is a schematic exploded perspective view of the latch assembly according to an exemplary embodiment.

As shown schematically in FIG. 4 according to an exemplary embodiment, latch 20 comprises a lower housing 30 and an upper housing 32; latch 20 also comprises button 24 and a spring 28; latch 20 also comprises two opposing pins 22 and two opposing links 26. According to an exemplary embodiment, upper housing 32 comprises a feature (e.g. shape or section) shown as a depression 320. (According to an exemplary embodiment the feature may comprise a protrusion or depression or other form/shape.) Latch 20 also comprises fasteners shown as screws 34.

As shown schematically in FIG. 4 according to an exemplary embodiment, spring 28 is placed between button 24 and lower housing 30 to facilitate movement of button 24 between the un-depressed position and the depressed position. According to an exemplary embodiment, a first end of each link 26 may be coupled to the corresponding side of button 24; a second end of each link 26 may be coupled to a first hole on pin 22. See also FIG. 5A. A second hole of each pin 22 may be coupled to lower housing 30. See also FIG. 5A. Screws 34 may be configured to secure lower housing 30 and upper housing 32; screws 34 may also be configured to secure pins 22, links 26, button 24 and spring 28 between lower housing 30 and upper housing 32.

According to an exemplary embodiment as shown schematically in FIGS. 5A to 5E, 6A to 6F, 9A to 9E and 10A to 10E, door 12 is configured for movement (e.g. at direction of a vehicle occupant) in use from the closed position to the open position.

According to an exemplary embodiment as shown schematically in FIGS. 5A to 5E, a hand H from a vehicle occupant may depress button 24; spring 28 is compressed. As shown schematically in FIG. 5A, door 12 is at the closed position; pins 22 are engaged in the corresponding gaps G on side rails 14 (i.e. at the extended position). As shown schematically in FIGS. 5B to 5D according to an exemplary embodiment, as button 24 moves (e.g. is actuated) from the un-depressed position to the depressed position, pins 22 may pull out of engagement from gaps G (i.e. at the retracted position) via the linkage formed between button 24, links 26 and pins 22. As shown schematically in FIGS. 5D and 5E, latch 20 is out of engagement from gaps G; pins 22 are at the retracted position; side walls on side rails 14 keep pins 22 at the retracted position.

According to an exemplary embodiment as shown schematically in FIGS. 6A to 6F, hand H depresses button 24 on door 12; door 12 is unlocked from the closed position; door 12 moves relative to base 11 of component 10 towards the open position; bin 18 is exposed when door 12 is at the open position.

According to an exemplary embodiment as shown schematically in FIGS. 9A to 9E and 10A to 10E, after pins 22 are disengaged from the locked/extended position, pins 22 may be held or retained in the unlocked/retracted position by the side walls of side rails 14; hand H may open door 12 by engaging any part of door 12 accessible to the vehicle occupant (e.g. depression 320, etc.).

As shown schematically in FIGS. 7A to 7E and 8A to 8F, door 12 is configured for movement (e.g. at direction of a vehicle occupant) in use from the open position to the closed position according to an exemplary embodiment.

According to an exemplary embodiment as shown schematically in FIGS. 7A to 7E, hand H may engage depression 320 on door 12 to slide door 12 towards the closed position. As shown schematically in FIG. 7A, door 12 is at the open position. As shown schematically in FIGS. 7A and 7B, latch 20 is out of engagement from gaps G; pins 22 are at the retracted position; side walls on side rails 14 keep pins 22 at the retracted position. As shown schematically in FIGS. 7B to 7D according to an exemplary embodiment, as button 24 moves from the depressed position to the un-depressed position (by spring 28), pins 22 push into engagement with gaps G (i.e. towards the extended position) via the linkage formed between button 24, links 26 and pins 22. As shown schematically in FIG. 7E, pins 22 are engaged in the corresponding gaps G on the side rails 14 (i.e. at the extended position) to lock door 12 at the closed position.

According to an exemplary embodiment as shown schematically in FIGS. 8A to 8F, hand H engages with depression 320 on door 12; door 12 is moved from the open position to the closed position; door 12 is locked at the closed position; door 12 moves relative to base 11 of component 10 towards the closed position; bin 18 is covered by door 12 when door 12 is at the closed position.

Referring to FIGS. 1C-1D, 2A-2B, 4, 5A-5E, 7A-7E, 9A-9E and 10A-10E as shown schematically according to an exemplary embodiment, a component (e.g. console) for a vehicle interior may comprise a base comprising a bin (e.g. compartment) and a cover (e.g. door) configured to cover the bin and move to uncover the bin (see e.g. FIGS. 6A-6F and 8A-8F); an interface (e.g. button, mechanism, etc.) may be provided for the cover (see e.g. FIGS. 2A-2B and 3A-3C); and a mechanism comprising a pin (or set of pins) may be provided for the cover and base (see e.g. FIGS. 4 and 5A-5E).

According to an exemplary embodiment as shown schematically, the pin/set mechanism may be configured to retain the cover to the base (e.g. seated) and rotate in response to translation (e.g. at the user interface) to release the cover from the base. See e.g. FIGS. 4, 5A-5E, 6A-6F, 7A-7E, 8A-8F, 9A-9E and 10A-10E. According to an exemplary embodiment as shown schematically, the cover may move relative to the bin in response to rotation of the pin/set of pins. See e.g. FIGS. 5A-5C, 7C-7E and 9A-9C. The interface may comprise a button configured to be deployed in alignment with a direction of movement of the cover. See e.g. FIGS. 2A-2B, 3A-3C, 4, 5A-5E, 6A-6F, 7A-7E and 9A-9E. According to an exemplary embodiment, the button may be positioned (and/or may provide a feature such as an indentation, protrusion or depression, ridges, etc.) to facilitate use by an occupant to manipulate (e.g. open/close) the cover. See e.g. FIGS. 2A-2B, 3A-3C and 4 (showing tooth and groove for button travel).

According to an exemplary embodiment as shown schematically, the pin/set of pins may be configured and operate to maintain alignment of the cover during movement (e.g. hold cover in a generally centered/aligned position with respect to side rails). See e.g. FIGS. 5E, 7A and 9E. According to an exemplary embodiment as shown schematically, a spring (or spring mechanism) may be provided in association with the user interface (e.g. button) and with the pin/mechanism arrangement to facilitate actuation and operation. See e.g. FIGS. 4, 5A-5E and 6A-6F.

According to an exemplary embodiment as shown schematically in FIGS. 5A to 5E, cover 12 may be configured to cover bin 18 and move in an opening direction to uncover bin 18. Component 10 may comprise interface 24 for cover 12 and mechanism 20 configured to retain cover 12 to base 11. Mechanism 20 may comprise at least one pin 22 configured to rotate in response to translation at interface 24 to release cover 12 from base 11. Cover 12 may move relative to bin 18 as at least one pin 22 rotates in response to translation at interface 24. At least one pin 22 may be configured to move from an engaged position as shown schematically in FIG. 5A to a detached position as shown schematically in FIG. 5D through a partially detached position as shown schematically in FIGS. 5B/5C. Cover 12 may be configured to move relative base 11 when at least one pin 22 is in the partially detached position. Interface 24 may comprise a button 24 configured to be deployed in alignment with the opening direction. Button 24 may be configured to move in the opening direction from a forward position as shown schematically in FIG. 5A to a rearward position as shown schematically in FIG. 5E to unlock cover 12 from base 11. Mechanism 20 may comprise at least one link 26 configured to rotate at least one pin 22 to unlock cover 12 from base 11 in response to translation of button 24. At least one link 26 may be configured to rotate in response to translation of button 24 to rotate at least one pin 22 to unlock cover 12 from base 11. A first end of at least one link 26 may be coupled to button 24 and a second end of the at least one link 26 may be coupled to at least one pin 22.

According to an exemplary embodiment as shown schematically in FIGS. 5A to 5E, cover 12 may be configured to cover bin 18 and move in an opening direction to uncover bin 18. Component 10 may comprise interface 24 for cover 12 and mechanism 20 configured to retain cover 12 to base 11. Interface 24 may comprise a button 24 configured to move in the opening direction from a forward position as shown schematically in FIG. 5A to a rearward position as shown schematically in FIG. 5E to unlock cover 12 from base 11. Cover 12 may comprise spring 28 configured to bias button 24 in the forward position as shown schematically in FIG. 5A. Spring 28 may be configured to compress in alignment with the opening direction in response to deployment of button 24 as shown schematically in FIGS. 5B to 5E. Spring 28 may be configured to bias button 24 in a direction generally opposite the opening direction as shown schematically in FIG. 5A. Mechanism 20 may comprise housing 30. Spring 28 may be compressed against housing 30 in response to deployment of button 24 as shown schematically in FIGS. 5B to 5E.

According to an exemplary embodiment as shown schematically in FIGS. 5A to 5E, cover 12 may be configured to cover bin 18 and move in an opening direction to uncover bin 18. Component 10 may comprise interface 24 for cover 12 and mechanism 20 configured to retain cover 12 to base 11. Interface 24 may comprise a button 24 configured to move from a forward position as shown schematically in FIG. 5A to a rearward position as shown schematically in FIG. 5E to unlock cover 12 from base 11. Cover 12 may be configured to move in the opening direction as button 24 moves from the forward position as shown schematically in FIG. 5A toward the rearward position as shown schematically in FIG. 5E. Mechanism 20 may comprise at least one pin 22 configured to move relative to base 11 from an engaged position as shown schematically in FIG. 5A to a detached position as shown schematically in FIG. 5E through a partially detached position as shown schematically in FIGS. 5B/5C. Cover 12 may be configured to move relative to base 11 when at least one pin 22 moves from the engaged position toward the partially detached position. The base may comprise at least one rail 14. At least one pin 22 may be configured to rotate relative to at least one rail 14 to unlock cover 12 from base 11. At least one rail 14 may comprise a gap G. At least one pin 22 may be configured to engage gap G to lock cover 12 to base 11. At least one pin 22 may be configured to rotate out of gap G to unlock cover 12 from base 11 as shown schematically in FIGS. 5B to 5D. Mechanism 20 may comprise at least one link 26 configured to rotate at least one pin 22 to unlock cover 12 from base 11. A first end of at least one link 26 may be coupled to button 24 and a second end of the at least one link 26 may be coupled to at least one pin 22. Button 24 may be configured to translate to rotate the first end of the at least one link 26 and the second end of the at least one link 26. Button 24 may be configured to move in the opening direction to move cover 12 in the opening direction to uncover bin 18 as shown schematically in FIGS. 5A to 5E.

Exemplary Embodiment

Referring to FIGS. 1A to 1D, a vehicle V may include a component for a vehicle interior I according to an exemplary embodiment. As shown schematically in FIG. 1B, interior I of vehicle V provides an instrument panel IP and a tambour door TD. As shown schematically in FIGS. 1C and 1D, a component 10 comprises a door 12 shown as a tambour door 12. According to an exemplary embodiment, tambour door 12 is configured to move between a closed position (see e.g. FIG. 1C) and an open position (see e.g. FIG. 1D). As shown schematically in FIGS. 1C and 1D, component 10 may be located in or be a portion of a floor console FC; floor console FC may be located between front seats ST in vehicle V. According to an exemplary embodiment, the component may be disposed at various locations within a vehicle.

As shown schematically in FIG. 2A according to an exemplary embodiment, component 10 may include a base 11, a bin or storage compartment 18, a door 12 and a latch 20. According to an exemplary embodiment, latch 20 is configured to lock door 12 to base 11 and unlock door 12 from base 11. When door 12 is unlocked, door 12 can be moved from a closed position (see e.g. FIGS. 1C and 2A) to an open position (see e.g. FIGS. 1D and 2B). When door 12 is in the open position, a storage volume in bin 18 is exposed and can be accessed.

According to an exemplary embodiment, base 11 is configured to provide support, positioning within the vehicle V and/or attachment to the vehicle V. According to an exemplary embodiment, base 11 may be a portion of floor console FC. As shown schematically in FIGS. 1C and 1D, floor console FC is located between the front seats ST in vehicle V.

According to an exemplary embodiment, base 11 may be configured in a variety of conventional or other configurations. Base 11 also can be formed from a variety of conventional or other materials. According to an exemplary embodiment, base 11 may be formed from plastic.

Figure 2B:
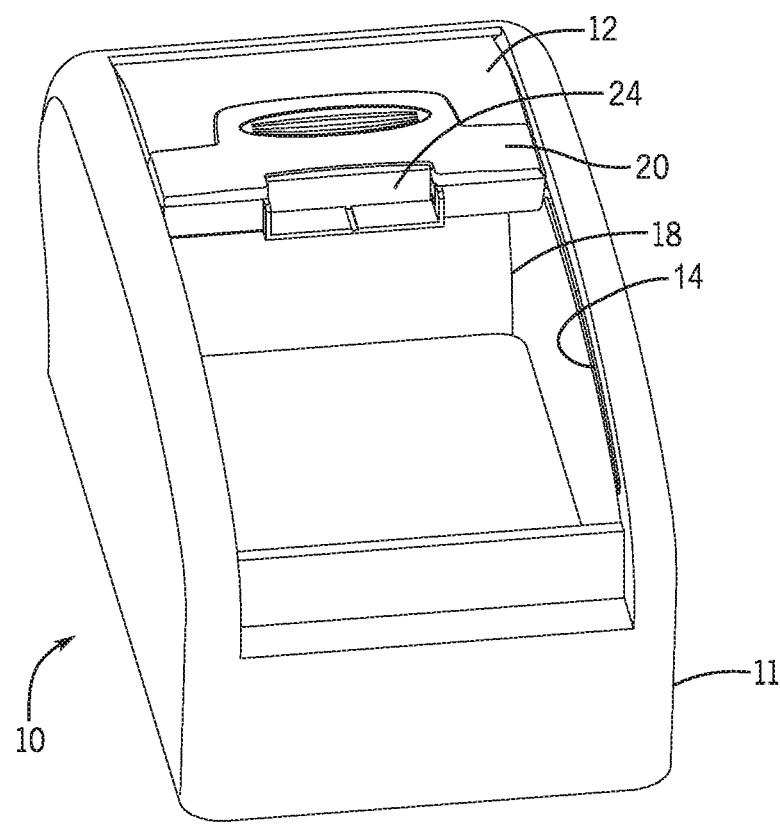
FIG. 2B is a schematic perspective view of the console for the vehicle interior in an open position according to an exemplary embodiment.
Figure 5A:
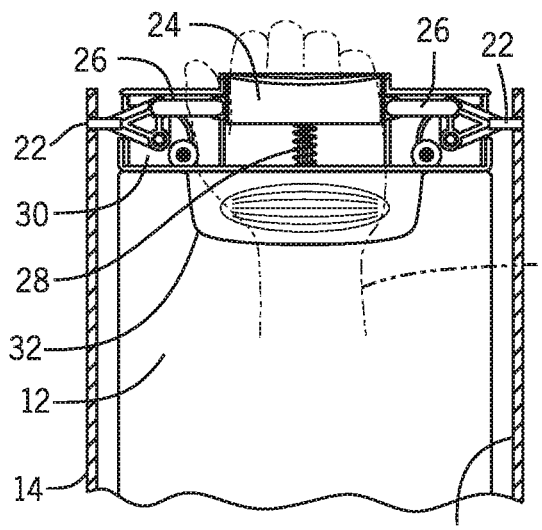
FIGS. 5A to 5E are schematic partial top plan partial views of a door for the console moving from the closed position to the open position according to an exemplary embodiment.

As shown schematically in FIGS. 2B and 5A, base 11 provides side rails 14. According to an exemplary embodiment, each of the two opposing side rails 14 may provide an area such as gap G (shown in FIGS. 5B and 5C) for latch 20 to lock door 12 in place relative to base 11. As shown schematically in FIGS. 5B and 5C, each side rail 14 provides a gap G; each of the two opposing pins 22 of latch 20 may insert and lock into a corresponding gap G to lock door 12 in position.

According to an exemplary embodiment, bin 18 is configured to provide storage. As shown schematically in FIG. 2B, bin 18 is recessed in base 11 to provide a storage volume. According to an exemplary embodiment, bin 18 may be located below door 12; door 12 can selectively cover bin 18 in the closed position (FIG. 2A) and expose bin 18 in the open position (FIG. 2B).

According to an exemplary embodiment, bin 18 may be configured in a variety of conventional or other configurations; bin 18 may be formed from a variety of conventional or other materials. According to an exemplary embodiment, bin 18 is defined by side walls of base 11. According to an exemplary embodiment, bin 18 may be a member that is fit into or affixed/attached to base 11.

According to an exemplary embodiment, door 12 may be configured to cover bin 18. Door 12 may be configured to move between the closed position in which the door 12 covers the bin 18 (FIG. 2A) and an open position in which the door 12 exposes the bin 18 (FIG. 2B). According to an exemplary embodiment, door 12 may be configured to slide relative to the base 11 between the closed position and the open position.

According to an exemplary embodiment, door 12 may be configured in a variety of conventional or other configurations. Door 12 also can be formed from a variety of conventional or other materials. According to an exemplary embodiment, door 12 may be a tambour door or a semi-rigid sheet that moves into a recess in base 11 as door 12 moves towards the open position. According to an exemplary embodiment, the door may be a flexible sheet, such as plastic or cloth; the door may fold together as the door is moved from the closed position to the open position.

According to an exemplary embodiment, latch 20 may be configured to selectively lock door 12 relative to base 11 and unlock door 12 from base 11. As shown schematically in FIG. 4, latch 20 comprises a lower housing 30 and an upper housing 32. Lower housing 30 and upper housing 32 may at least partially house, contain or hold components of latch 20 (e.g. a button 24, pins 22, links 26 and/or a spring 28). Lower housing 30 and upper housing 32 may be attached or connected by screws 34. Upper housing 32 may further include a depression 320 formed in upper housing 32.

As shown schematically in FIGS. 2A and 2B, according to an exemplary embodiment, latch 20 can include an actuator, slide block or button (shown as button 24); button 24 can be depressed by a vehicle occupant to unlock door 12 from base 11. Door 12 may be moved relative to base 11 as button 24 of latch 20 is depressed.

As shown schematically in FIG. 3A, latch 20 includes two opposing pins 22; pins 22 extend outward from latch 20. Pins 22 may be assembled within latch 20; at least a portion of each pin 22 extends from the corresponding side of lower housing 30 (and/or upper housing 32) of latch 20. According to an exemplary embodiment, pins 22 may be attached to lower housing 30 as shown in FIG. 4. As shown schematically in FIGS. 3B and 3C, pins 22 are configured to rotate as button 24 is depressed.

As shown schematically in FIGS. 4 and 5A to 5E, latch 20 may include two opposing links 26 to connect button 24 to the corresponding pins 22. According to an exemplary embodiment, a first end of link 26 may be assembled or attached to button 24; a second end of link 26 may be assembled or attached to the corresponding pin 22.

Figure 5B:
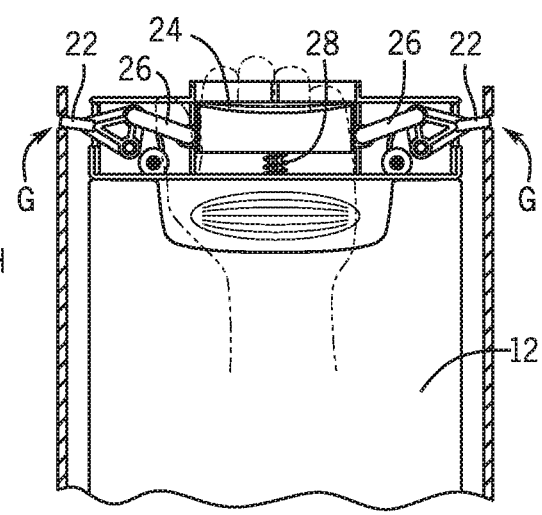

As shown schematically in FIGS. 4, 5A and 5B, latch 20 may include a spring 28. Spring 28 may be positioned or provided between button 24 and lower housing 30; spring 28 moves between an extended position and a compressed position. At the extended position, pins 22 are positioned in gaps G in the corresponding side rails 14 of base 11. According to an exemplary embodiment, spring 28 may provide a force to bias or move button 24 toward or into the locked position.

Figure 5C:
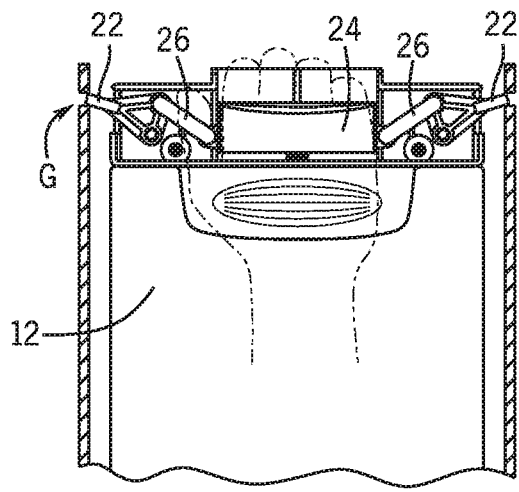
Figure 5D:
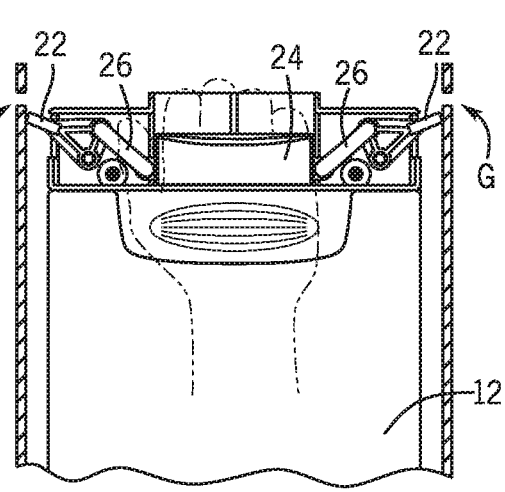
Figure 5E:
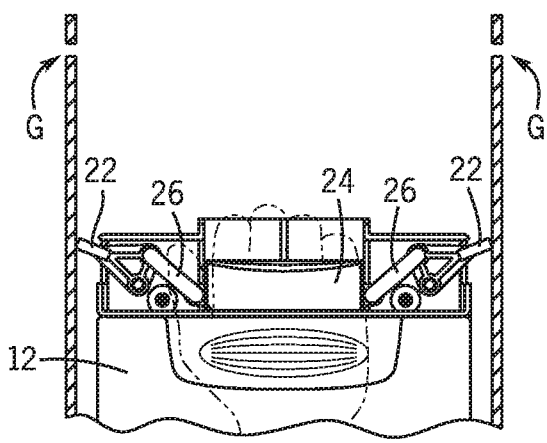
Figure 6A:
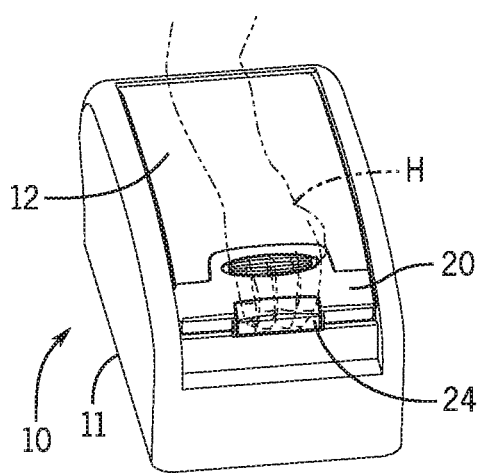
FIGS. 6A to 6C and 6E to 6F are schematic perspective views of the door for the console moving from the closed position to the open position according to an exemplary embodiment.
Figure 6B:
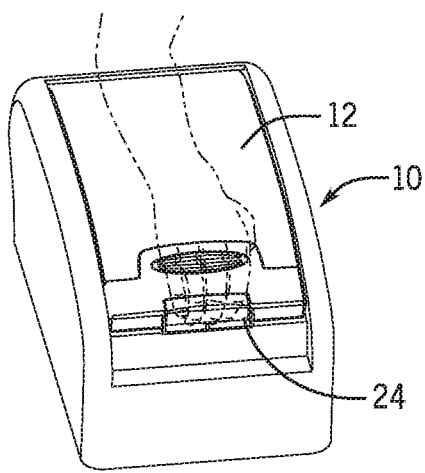
Figure 6C:
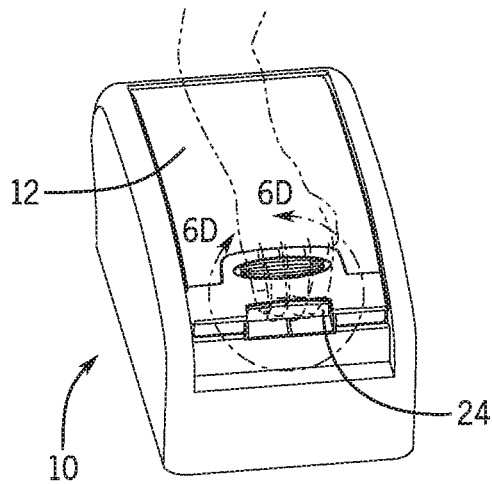
Figure 6D:
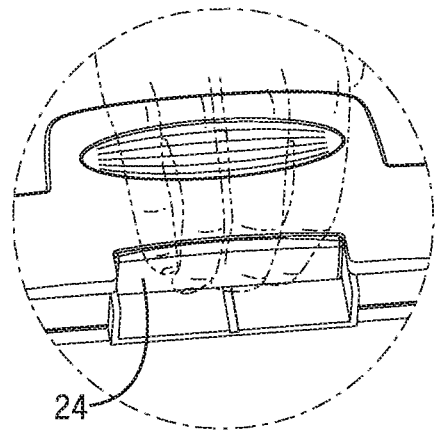
FIG. 6D is a schematic perspective view of the latch mechanism for the door for the console according to an exemplary embodiment.
Figure 6E:
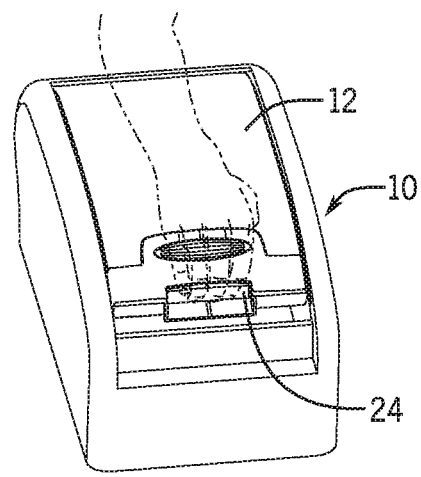

As shown schematically in FIGS. 5A to 5E and 6A to 6E, door 12 may be moved relative to base 11 from a locked/closed position (see e.g. FIGS. 5A and 6A) to an unlocked/open position (see e.g. FIGS. 5E and 6E). As shown schematically in FIG. 5A, latch 20 may secure door 12 in the locked/closed position by locking with side rails 14 of base 11. When button 24 is depressed by a vehicle occupant (see e.g. FIGS. 5B to 5E) latch 20 may be disengaged from side rails 14 of base 11 to unlock door 12 from base 11 and to move door 12 into the unlocked/open position.

As shown schematically in FIG. 5B, when button 24 is depressed by a vehicle occupant (e.g. by hand H of an occupant), spring 28 is compressed between button 24 and lower housing 30. As button 24 is depressed, links 26 (a first end of each link 26 is attached to the corresponding side of button 24) rotate accordingly and move pins 22 out of gaps G in the side rails 14 of base 11 and unlocks door 12. According to an exemplary embodiment, door 12 may slide relative to base 11 as button 24 is depressed. According to an exemplary embodiment, latch 20 may not be fully actuated or pins 22 on latch 20 may not be fully detached from the gaps G of the side rails 14 for door 12 to begin sliding relative to base 11. According to an exemplary embodiment, the direction of the force for depressing button 24 is generally in the same direction of the movement for sliding door 12 relative to base 11 from the locked/closed position into the open position.

As shown schematically in FIG. 5C, pins 22 are driven or moved further out of gaps G of side rails 14 of base 11 by depressing button 24 further (compared to the position shown in FIG. 5B).

As shown schematically in FIGS. 5D and 5E, pins 22 are driven or moved further out of gaps G of side rails 14 of base 11 by depressing button 24 further (compared to the position shown in FIG. 5C); door 12 is unlocked and movable relative to base 11. Side rails 14 of base 11 may prevent pins 22 from moving outward. According to an exemplary embodiment, side rails 14 may keep pins 22 and links 26 to remain in a retracted position relative to button 24; spring 28 is compressed when pins 22 and links 26 are in the retracted position; button 24 remains in the depressed position (in which door 12 is unlocked) when pins 22 and links 26 are in the retracted position. According to an exemplary embodiment, a vehicle occupant may continue to exert a force to button 24, which may further depress button 24 and/or slide door 12 relative to base 11.

Figure 6F:
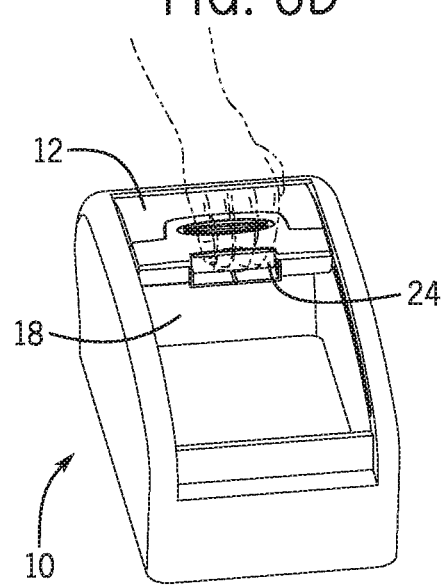

As shown schematically in FIGS. 6A to 6F, latch 20 may be used to unlock door 12 from base 11 by depressing button 24 to move door 12 from the closed position (shown in FIG. 6A) to the open position (shown in FIG. 6F). At the open position, the storage volume and the interior area of bin 18 is exposed or uncovered. According to an exemplary embodiment, the occupant may depress button 24 and unlock door 12 from base 11. According to an exemplary embodiment, door 12 may move or slide relative to base 11 generally in the same direction as the direction of depression of button 24.

As shown schematically in FIGS. 9A to 9E and 10A to 10E, after button 24 is depressed (see e.g. FIGS. 9D, 9E and 10C) the occupant can provide force to any portion of door 12 (including depression 320) to slide door 12 to the open position to uncover bin 18 and the storage volume (or to the closed position to cover bin 18 and the storage volume). The vehicle occupant may not continue to depress button 24 to slide door 12 along the side rails 14.

Figure 7A:
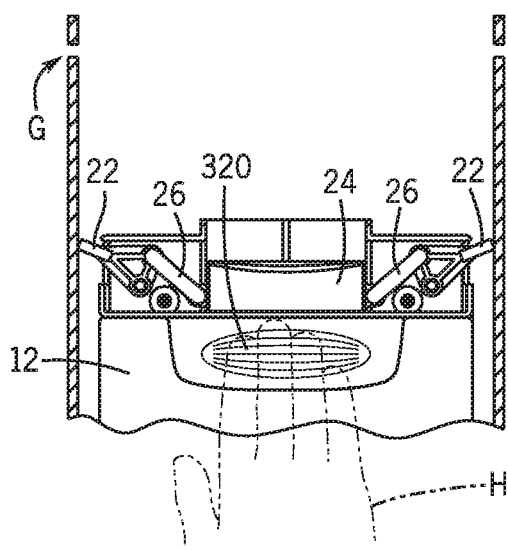
FIGS. 7A to 7E are schematic partial top plan views of the door for the console moving from the open position to the closed position according to an exemplary embodiment.
Figure 7B:
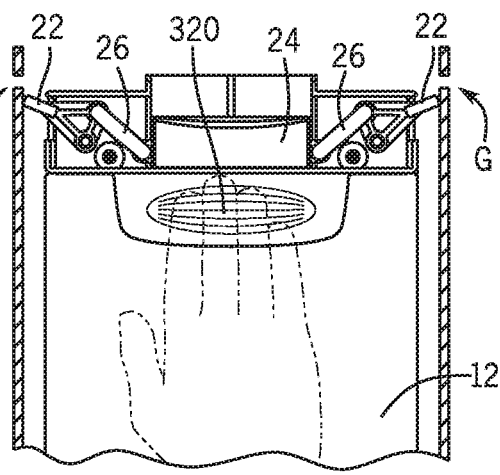
Figure 7C:
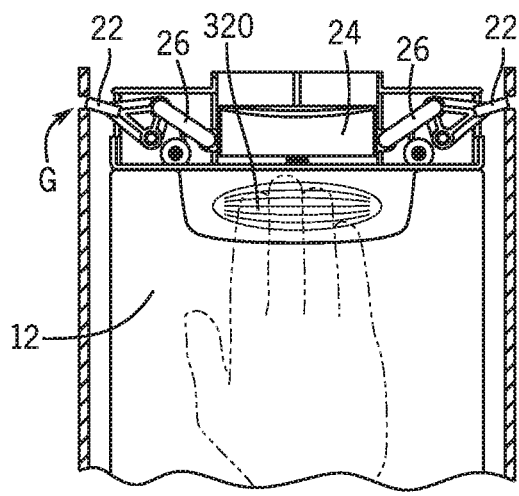
Figure 7D:
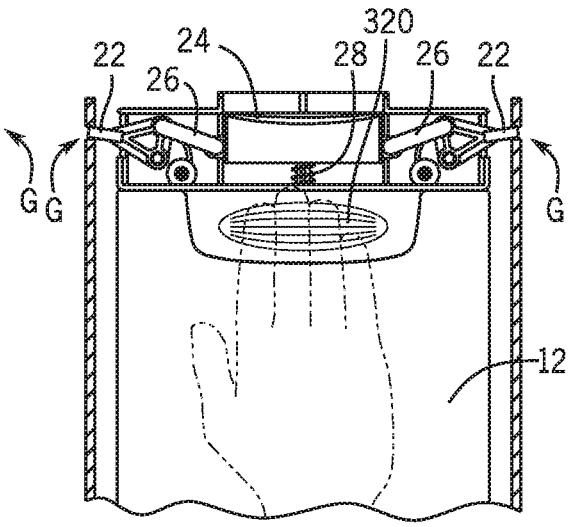
Figure 7E:
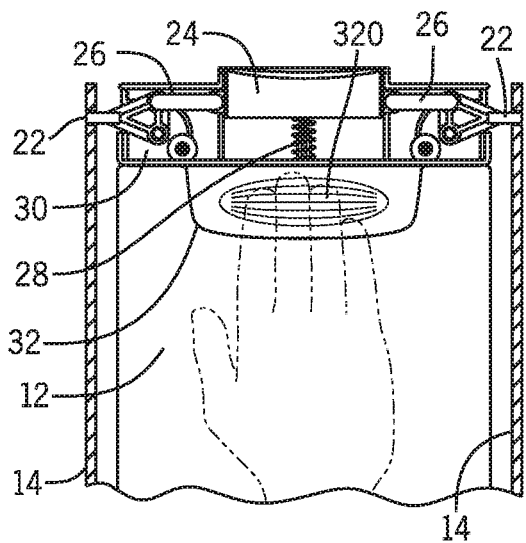
Figure 9A:
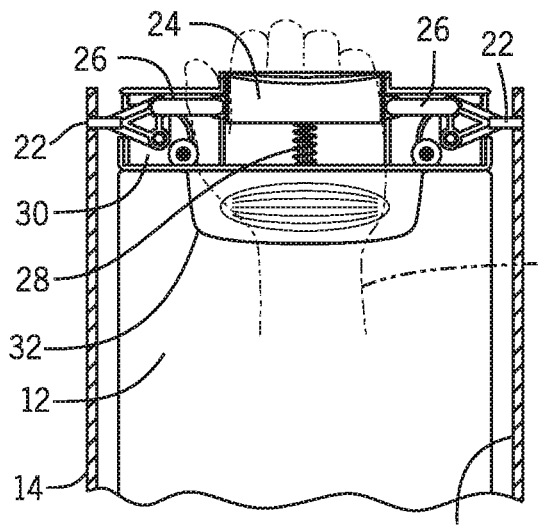
FIGS. 9A to 9E are schematic partial top plan views of the door for the console moving from the closed position to the open position according to an exemplary embodiment.
Figure 9B:
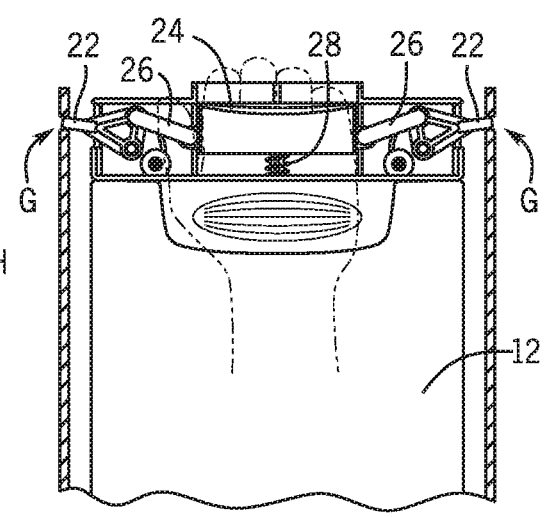
Figure 9C:
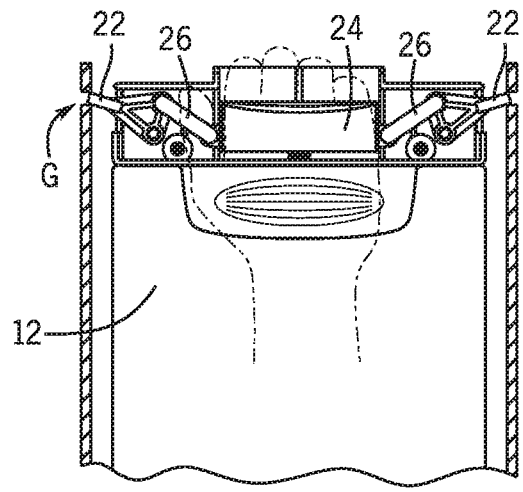
Figure 9D:
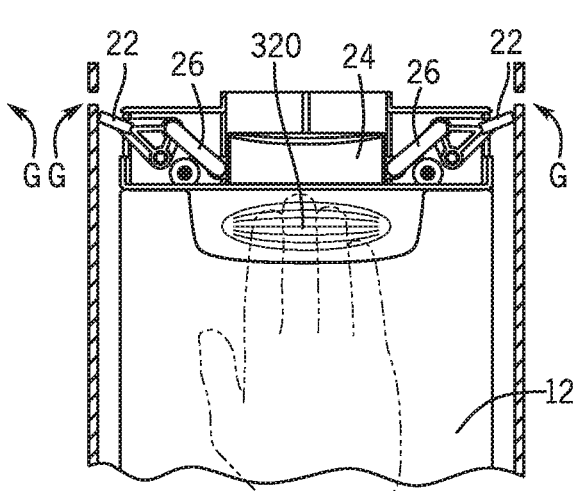
Figure 9E:
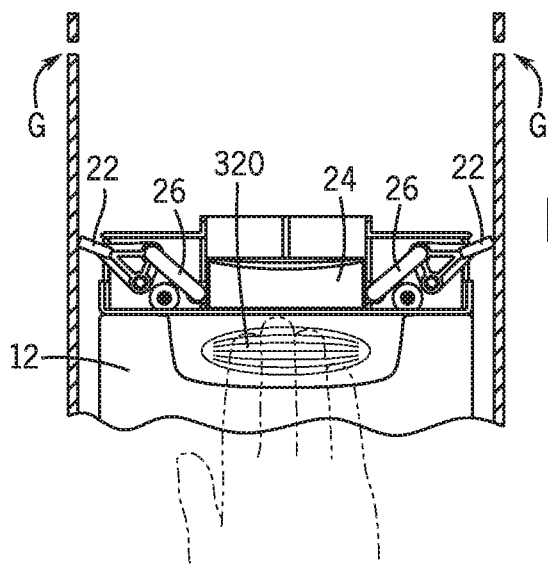

As shown schematically in FIGS. 7A to 7E and 8A to 8E, door 12 may be moved relative to base 11 from the unlocked/open position (shown in FIGS. 7A and 8A) to the locked/closed position (shown in FIGS. 7E and 8F).

As shown schematically in FIGS. 7A, 7B and 8A to 8E, door 12 may not be locked to the base 11 when the door 12 is open or partially open. According to an exemplary embodiment, a vehicle occupant may move latch 20 toward gaps G in the side rails 14 to close or lock door 12; door 12 may slide towards the locked position. Before latch 20 reaches gaps G in the side rails 14, side rails 14 of base 11 keep pins 22 and links 26 in the retracted position relative to button 24; spring 28 compressed when pins 22 and links 26 are in the retracted position. According to an exemplary embodiment, button 24 is configured to remain in the depressed position; door 12 remains unlocked. According to an exemplary embodiment, door 12 remains unlocked until latch 20 latches to gaps G in the side rails 14; a vehicle occupant may apply a force to any portion of door 12 (e.g. depression 320, etc.) to slide door 12.

As shown in the schematic views of FIGS. 7C and 8E, when pins 22 of latch 20 are near gaps G of the side rails 14 (and door 12 is near the closed position) button 24 begins to return to an un-depressed position as pins 22 engage with and move into the corresponding gaps G of side rails 14 of base 11; door 12 is locked into the closed position when pins 22 are moved into gaps G. According to an exemplary embodiment, links 26 rotate with pins 22 as pins 22 move into the gaps G; button 24 returns to the un-depressed position. According to an exemplary embodiment, spring 28 may facilitate movement of button 24 into the un-depressed position; spring 28 may facilitate movement of pins 22 into gaps G of side rails 14.

As shown schematically in FIG. 7D, links 26 rotate with pins 22 as pins 22 enter into gaps G of side rails 14; button 24 slides towards the un-depressed position. As shown schematically in FIGS. 7E and 8F, pins 22 are engaged within gaps G; door 12 is locked into the closed position; button 24 is in the un-depressed position.

According to an exemplary embodiment, the component 10 is configured such that the door 12 moves relative to the base 11 as the latch 20 is actuated.

According to an exemplary embodiment, component 10 is configured such that the force required to unlatch door 12 and the force to slide door 12 can be applied at the same position and continuously. According to an exemplary embodiment, the present invention is configured to allow a smooth continuous force applied to unlatch and slide the door in one motion.

According to an exemplary embodiment, component 10 is configured such that the force to unlock the door from the base is less than the force to slide the door relative to the base.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior comprising:
   (a) a base comprising a bin;
   (b) a cover configured to cover the bin and move in an opening direction to uncover the bin;
   (c) an interface for the cover; and
   (d) a mechanism configured to retain the cover to the base;
   wherein the mechanism comprises at least one pin configured to rotate in response to translation at the interface to release the cover from the base;
   wherein the cover is configured to move relative to the bin as the at least one pin rotates in response to translation at the interface.

2. The component of claim 1 wherein the interface comprises a button configured to translate to actuate the mechanism; and wherein the cover is configured to move in alignment with the button as the at least one pin of the mechanism rotates in response to translation at the button to actuate the mechanism.

3. The component of claim 1 wherein the at least one pin is configured to move from an engaged position to a detached position through a partially detached position;

wherein the cover is configured to move relative to base when the at least one pin is in the partially detached position.

4. The component of claim 1 wherein the interface comprises a button configured to be deployed in alignment with the opening direction.

5. The component of claim 4 wherein the button is configured to move in the opening direction from a forward position to a rearward position to unlock the cover from the base.

6. The component of claim 4 wherein the mechanism comprises at least one link configured to rotate the at least one pin to unlock the cover from the base in response to translation of the button.

7. The component of claim 6 wherein the at least one link is configured to rotate in response to translation of the button to rotate the at least one pin to unlock the cover from the base.

8. The component of claim 6 wherein a first end of the at least one link is coupled to the button and a second end of the at least one link is coupled to the at least one pin.

9. A component for a vehicle interior comprising:
(a) a base comprising a bin;
(b) a cover configured to cover the bin and move in an opening direction to uncover the bin;
(c) an interface for the cover; and
(d) a mechanism configured to retain the cover to the base;
wherein the interface comprises a button configured to move in the opening direction from a forward position to a rearward position to unlock the cover from the base.

10. The component of claim 9 wherein the cover comprises a spring configured to bias the button in the forward position.

11. The component of claim 10 wherein the spring is configured to compress in alignment with the opening direction in response to deployment of the button.

12. The component of claim 10 wherein the spring is configured to bias the button in a direction generally opposite the opening direction.

13. The component of claim 10 wherein the mechanism comprises a housing; wherein the spring is compressed against the housing in response to deployment of the button.

14. A component for a vehicle interior comprising:
(a) a base comprising a bin;
(b) a cover configured to cover the bin and move in an opening direction to uncover the bin;
(c) an interface for the cover; and
(d) a mechanism configured to retain the cover to the base;
wherein the interface comprises a button configured to move from a forward position to a rearward position to unlock the cover from the base; and
wherein the cover is configured to move in the opening direction as the button moves from the forward position toward the rearward position.

15. The component of claim 14 wherein the mechanism comprises at least one pin configured to move relative to the base from an engaged position to a detached position through a partially detached position; wherein the cover is configured to move relative to base when the at least one pin moves from the engaged position toward the partially detached position.

16. The component of claim 15 wherein the base comprises at least one rail; wherein the at least one pin is configured to rotate relative to the at least one rail to unlock the cover from the base.

17. The component of claim 16 wherein the at least one rail comprises a gap; wherein the at least one pin is configured to engage the gap to lock the cover to the base; and wherein the at least one pin is configured to rotate out of the gap to unlock the cover from the base.

18. The component of claim 15 wherein the mechanism comprises at least one link configured to rotate the at least one pin to unlock the cover from the base.

19. The component of claim 18 wherein a first end of the at least one link is coupled to the button and a second end of the at least one link is coupled to the at least one pin; wherein the button is configured to translate to rotate the first end of the at least one link and the second end of the at least one link.

20. The component of claim 14 wherein the button is configured to move in the opening direction to move the cover in the opening direction to uncover the bin.

* * * * *